(12) United States Patent
Bond

(10) Patent No.: US 8,416,245 B2
(45) Date of Patent: Apr. 9, 2013

(54) CREATION OF MOTION BLUR IN IMAGE PROCESSING

(75) Inventor: Barry Bond, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1011 days.

(21) Appl. No.: 12/014,103

(22) Filed: Jan. 15, 2008

(65) Prior Publication Data

US 2009/0179898 A1 Jul. 16, 2009

(51) Int. Cl.
 G06T 13/00 (2011.01)
 G06T 1/00 (2006.01)
 G09G 5/00 (2006.01)
(52) U.S. Cl.
 USPC .......... 345/473; 345/474; 345/475; 345/581; 345/501
(58) Field of Classification Search .................. None
 See application file for complete search history.

(56) References Cited

U.S. PATENT DOCUMENTS

| | | |
|---|---|---|
| 5,751,376 A | 5/1998 | Hirai |
| 6,426,755 B1 | 7/2002 | Deering |
| 6,654,020 B2 | 11/2003 | Mori |
| 6,956,576 B1 | 10/2005 | Deering et al. |
| 2003/0234789 A1 | 12/2003 | Gritz |
| 2005/0134591 A1 | 6/2005 | Baxter |
| 2005/0134598 A1 | 6/2005 | Baxter et al. |
| 2005/0253853 A1* | 11/2005 | Sayre et al. ................... 345/474 |
| 2005/0282630 A1* | 12/2005 | Kaku et al. ..................... 463/31 |
| 2006/0227144 A1 | 10/2006 | Bleiweiss |
| 2007/0120858 A1 | 5/2007 | Meinds |

OTHER PUBLICATIONS

Akenine-Möller et al, "Stochastic Rasterization using Time-Continuous Triangles", Graphics Hardware (2007).pp. 1-11.
Wloka et al, "Interactive Real Time Motion Blur", Science and Technology Center for Computer Graphics and Scientific Visualization, Brown University (undated).pp. 1-43.
Guan et al, "Point-based Surface Rendering with Motion Blur", Eurographics Symposium on Point-Based Graphics (2004).pp. 1-8.
Shimizu et al, "Hardware Accelerated Motion Blur Generation", University of Minnesota Computer Science Department Technical Report (Jan. 2003).pp. 1-8.

* cited by examiner

*Primary Examiner* — Tize Ma
(74) *Attorney, Agent, or Firm* — Westman, Champlin & Kelly, P.A.

(57) ABSTRACT

Motion blur is created in images by utilizing a motion vector. Vertices are developed with each vertex including a motion vector. The motion vector is indicative of how far vertices have moved since a previous frame in a sequence of images. The vertices are converted to an image and motion blur is added to the image as a function of the motion vector for each vertex.

20 Claims, 6 Drawing Sheets

CREATION OF MOTION BLUR IN IMAGE PROCESSING

BACKGROUND

Computer animated scenes, for example those found in motion pictures, television shows, and video games, are intended to simulate realistic situations. Current applications that generate these scenes can interface with a graphics processing unit that generates an image from data produced by the application. Applying motion blur to objects in motion within these scenes makes the motion of the object appear more realistic.

The discussion above is merely provided for general background information and is not intended to be used as an aid in determining the scope of the claimed subject matter.

SUMMARY

Motion blur is created in images by utilizing a motion vector. Vertices are developed with each vertex including a motion vector. The motion vector is indicative of how far vertices have moved since a previous frame in a sequence of images. The vertices are converted to an image and motion blur is added to the image as a function of the motion vector for each vertex.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
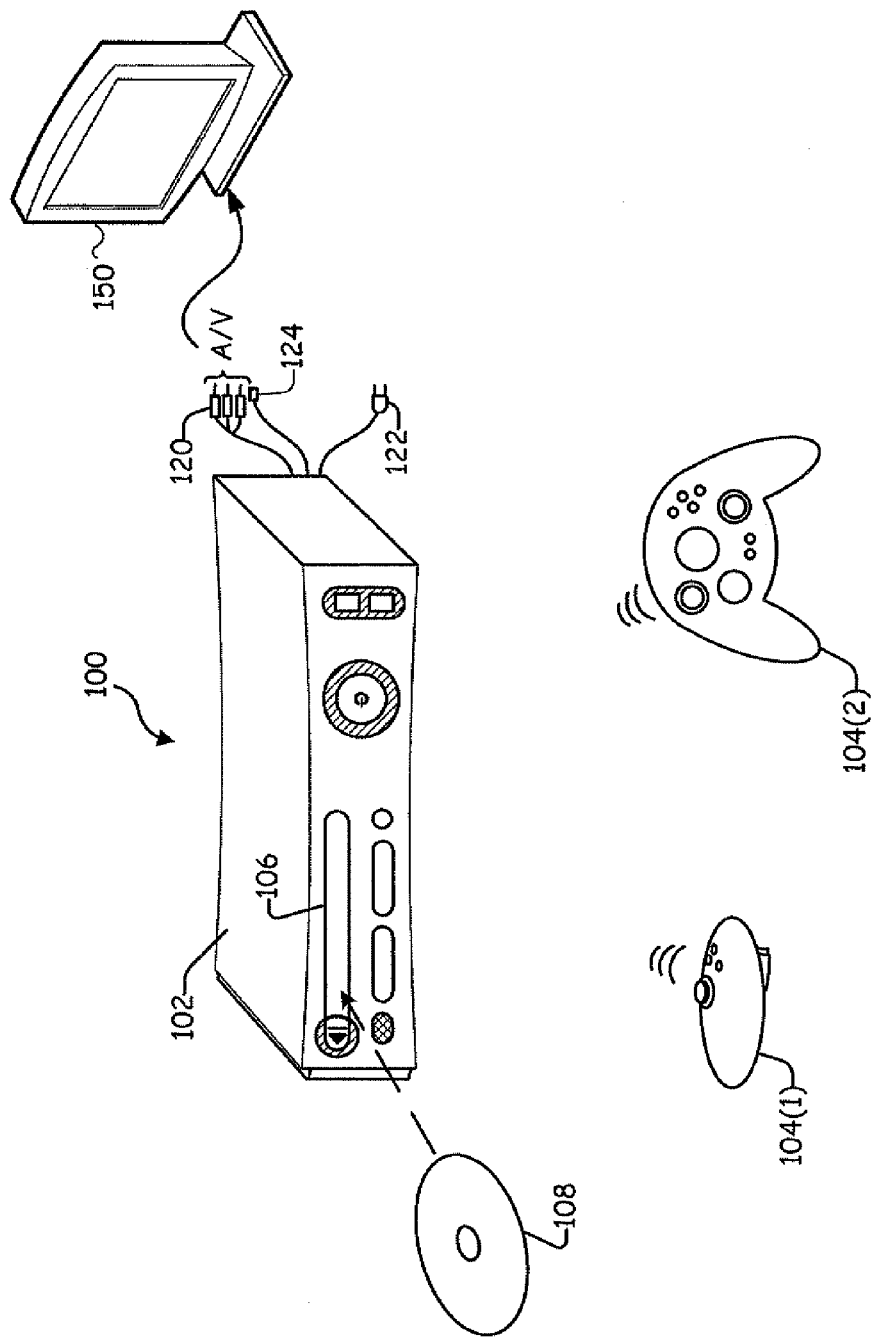
FIG. 1 is an isometric view of an exemplary gaming and media system.

Concepts presented herein relate to rendering computer animated scenes in a series of frames on a display. Each frame is an image displayed based on graphics data received from an application. Motion blur is added to images to make movement of objects in the image appear more realistic. FIG. 1 is an exemplary gaming console environment for displaying computer animated scenes, although other environments can also be utilized to practice the concepts presented herein. Such environments include, but are not limited to, personal computers, laptop computers, mobile devices, cellular phones and the like.

As shown in FIG. 1, gaming and media system 100 includes a game and media console (hereinafter "console") 102. In general, console 102 is one type of computing system, as will be further described below. Console 102 is configured to accommodate one or more wireless controllers, as represented by controllers 104(1) and 104(2). Console 102 is equipped with an internal hard disk drive (not shown) and a portable media drive 106 that supports various forms of portable storage media, as represented by optical storage disc 108. Examples of suitable portable storage media include DVD, CD-ROM, game discs, and so forth.

Console 102 connects to a television or other display 150 via A/V interfacing cables 120. In one implementation, console 102 is equipped with a dedicated A/V port (not shown) configured for content-secured digital communication using A/V cables 120 (e.g., A/V cables suitable for coupling to a High Definition Multimedia Interface "HDMI" port on a high definition monitor or other display device). A power cable 122 provides power to the game console. Console 102 may be further configured with broadband capabilities, as represented by a cable or modem connector 124 to facilitate access to a network, such as the Internet. The broadband capabilities can also be provided wirelessly, through a broadband network such as a wireless fidelity (Wi-Fi) network.

Gaming and media system 100 is generally configured for playing games stored on a memory medium, as well as for downloading and playing games, and reproducing pre-recorded music and videos, from both electronic and hard media sources. With the different storage offerings, titles can be played from the hard disk drive, from optical disk media (e.g., 108), from an online source, or from a memory unit. A sample of the types of media that gaming and media system 100 is capable of playing include:

Game titles played from CD and DVD discs, from the hard disk drive, or from an online source.

Digital music played from a CD in portable media drive 106, from a file on the hard disk drive (e.g., music in the Windows Media Audio (WMA) format), or from online streaming sources.

Digital audio/video played from a DVD disc in portable media drive 106, from a file on the hard disk drive (e.g., Active Streaming Format), or from online streaming sources.

During operation, console 102 is configured to receive input from controllers 104 and display information on display 150. For example, console 102 can display a user interface on display 150 to allow a user to operate and interact with an interactive game title.

Figure 2:
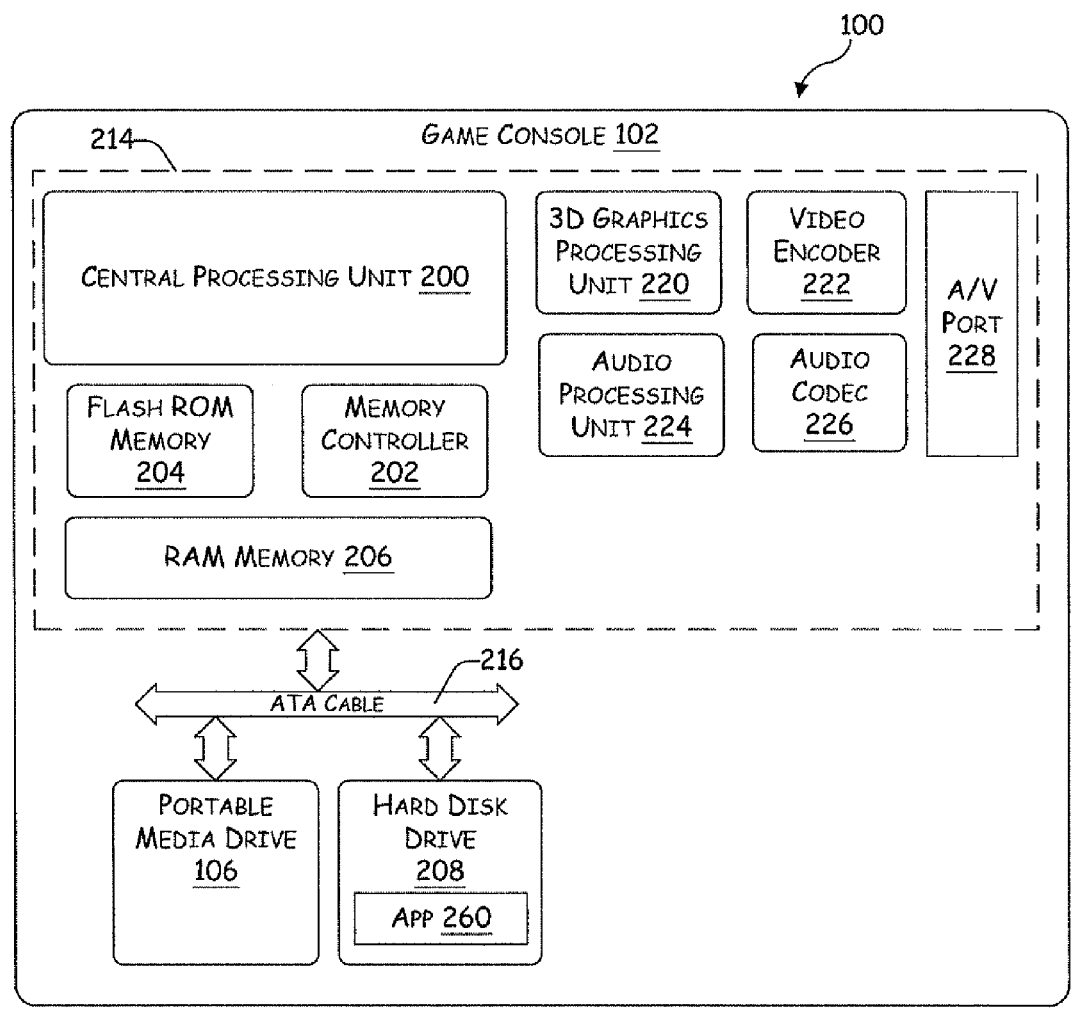
FIG. 2 is an exemplary functional block diagram of components of the gaming and media system shown in FIG. 1.

FIG. 2 is a functional block diagram of gaming and media system 100 and shows functional components of gaming and media system 100 in more detail. Console 102 has a central processing unit (CPU) 200, and a memory controller 202 that facilitates processor access to various types of memory, including a flash Read Only Memory (ROM) 204, a Random Access Memory (RAM) 206, a hard disk drive 208, and portable media drive 106.

A three-dimensional graphics processing unit (GPU) 220 and a video encoder 222 form a video processing pipeline for high speed and high resolution (e.g., High Definition) graphics processing. It is worth noting that GPU 220 and/or video encoder 222 can be implemented as software, hardware or a combination thereof. Data are carried from graphics processing unit 220 to video encoder 222 via a digital video bus (not shown). An audio processing unit 224 and an audio codec (coder/decoder) 226 form a corresponding audio processing pipeline for multi-channel audio processing of various digital audio formats. Audio data are carried between audio processing unit 224 and audio codec 226 via a communication link (not shown). The video and audio processing pipelines output data to an A/V (audio/video) port 228 for transmission to a television or other display. In the illustrated implementation, CPU 200, memory controller 202, ROM 204, RAM 206, as well as video and audio processing components 220-228 are mounted on a module 214.

In one example, an application 260 is configured to interact with CPU 200 and GPU 220 to present data on display 150. The data is displayed as a sequence of images (or frames) on the display. Application 260 provides data in the form of a plurality of vertices that are interpreted and transformed by GPU 220 to display data. Each vertex includes information associated therewith such as color, position, texture, etc. Additionally, each vertex includes a motion vector indicative of how far each vertex has traveled since the previous frame. In development of an application such as a game, application developers sometimes perform physical simulations of objects in motion and capture data related to this motion. This captured data can be useful in generating motion vectors. These motion vectors can be utilized by GPU 220 to add motion blur to images.

Adding motion blur to images can be a computationally expensive task. Motion blur can be added by the GPU 220, application 260 and/or a combination thereof. In some implementations, geometrical objects are extruded and blending is added to the extruded objects to create blur. This process can add computations to both CPU 200 and GPU 220 to determine an underlying shape of the object and how to extrude the object to create blur. In another implementation, old frames in a sequence are blended with new frames to create blur. This blending of frames can require old frames to be maintained in memory, which can lead to slower graphics processing.

Figure 3:
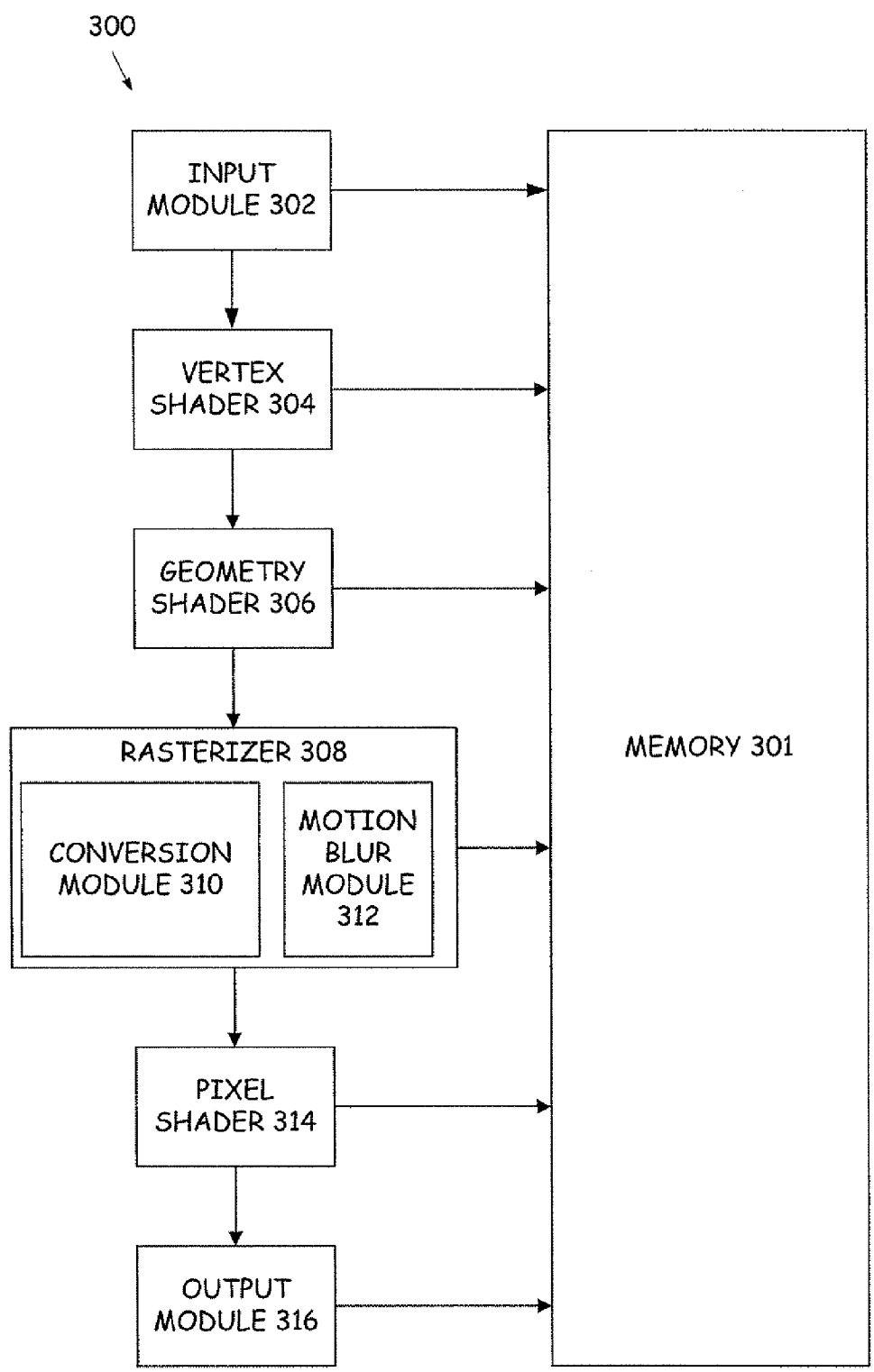
FIG. 3 is a functional block diagram of components of an exemplary graphics processing unit.

FIG. 3 is a block diagram of an exemplary graphical processing unit 300 that processes graphics data received from application 260. GPU 300 can be implemented as GPU 220 and includes several components that transform graphical data from the application into an image. The components form what can be referred to as a "graphics pipeline." The graphics pipeline can access memory 301, which can be used to store data related to graphical elements such as colors, textures, lighting, etc. Various components in the pipeline are referred to as shaders, which are a set of instructions for processing data provided by application 260. Shaders can be implemented in software, hardware or in a combination of hardware and software. Given data from application 260, GPU 300 renders an animated scene for output on a display. The scene can include several elements such as a background as well as objects that are both stationary and moving with respect to the background. The frames can occur at a specified rate in equal intervals (e.g. a frame every $\frac{1}{30}^{th}$ of a second). Thus, each frame can be associated with a specific time period. Motion blur can be added to objects in motion in order to provide a more realistic scene. Additionally, anti-aliasing and/or focusing techniques can be added to the images using the motion blur techniques described below.

GPU 300 includes an input module 302 that receives the graphical data from the application 260 that is to be rendered on a display device. The graphical data includes a plurality of vertices for rendering. Along with the plurality of vertices, general informational elements can be included that are utilized by the graphics pipeline to perform various operations. The informational elements can include position, color, texture, adjacent vertices, a motion vector, etc. The motion vector can be provided by the application and easily added in the development of the application since data related to motion is generally known by application developers. The plurality of vertices can be grouped into "primitives" that form shapes for rendering on a display. For example, the shapes can include a single vertex (a point), two vertices (a line), and/or three vertices (a triangle).

The plurality of vertices received from the input module 302 are sent to a vertex shader 304. The vertex shader 304 processes the vertices and performs various operations such as transformations, skinning, and lighting. For example, the vertex shader 304 can transform the plurality of vertices to change color, position, texture, lighting, etc. The vertex shader 304 also transforms the motion vector in a similar manner to its underlying vertex. For example, if a vertex is transformed to a new position using vertex shader 304, the associated motion vector can be transformed relative to the new position for the vertex.

Output from the vertex shader 304 is sent to a geometry shader 306, which processes the transformed plurality of vertices for rendering. Geometry shader 306 begins to process objects (i.e. shapes) from object vertices that are a part of the plurality of vertices, for example by producing a triangle from a group of three vertices. Geometry amplification, also known as geometry extrusion, can also be implemented in geometry shader 306. Geometry amplification refers to a process of forming neighboring shapes (i.e. triangles) adjacent to vertices within a shape grouping. As is known, a group of N adjacent vertices can be used to form N−2 triangles.

After the shapes have been produced, data from the geometry shader 306 is then sent to a rasterizer 308. The rasterizer 308 utilizes a conversion module 310 to convert the vertices from geometry shader 306 into an image format that includes a plurality of pixels for output on a display. In particular, the conversion module 310 converts the shapes, which are represented in three dimensions, to two dimensional points in the form of pixels. In addition to conversion module 310, rasterizer 308 also includes a motion blur module 312. The motion blur module 312 adds motion blur to the image created by conversion module 310. Motion blur is added as a function of a motion vector for each vertex. The motion vector identifies a distance and direction the vertex has traveled since a previous frame that has been rendered. Output from the rasterizer 308 is sent to a pixel shader 310 and generates pixel data, for example color. Data from the pixel shader 314 is then sent to an output module 316 to be rendered on a display device.

Figure 4:
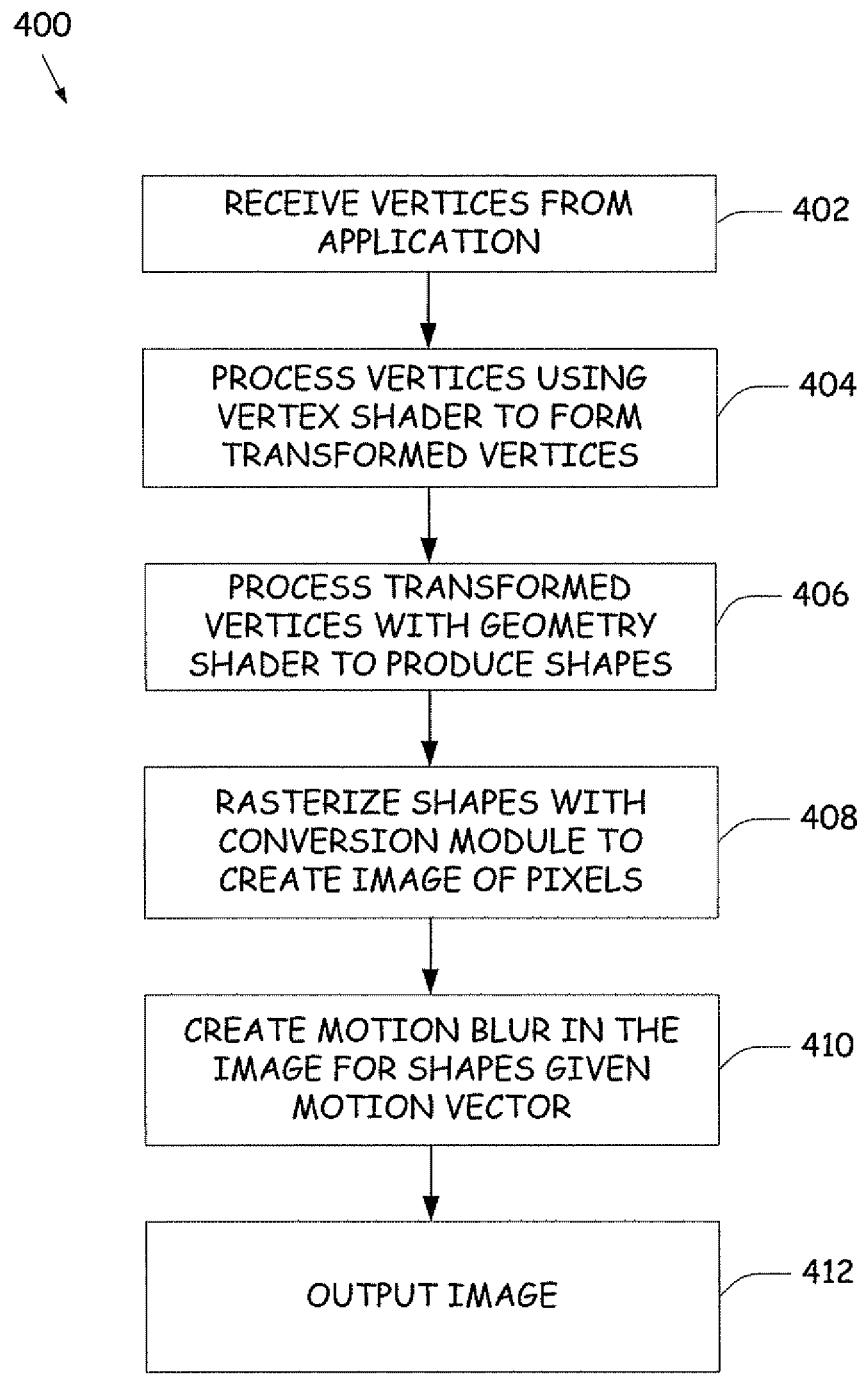
FIG. 4 is a flow diagram of a method of rendering images.

FIG. 4 is a flow diagram of a method 400 that can be implemented by GPU 300 for processing graphics data received from an application. The data from the application is processed to display a sequence of frames. At step 402, a plurality of vertices are received. Each vertex has information associated with it, for example position, color, texture, etc. In addition, each vertex also includes a motion vector that indicates how far the vertex has moved since a previous frame in a sequence of frames. At step 404, the plurality of vertices is subject to operations such as transformation, skinning, and/or lighting within vertex shader 304. At step 406, the plurality of vertices are processed by geometry shader 306 to form primitives. As discussed above, the primitives can be one vertex, two vertices and/or three vertices, for example. Geometry amplification can also be provided as discussed above. Next, at step 408, the primitives are rasterized. The rasterizing process can eliminate primitives that will not be displayed and convert the primitives to an image including pixels. This image does not account for motion blur associated with the objects in motion. Thus, little extra processing within the graphics pipeline has occurred to add motion blur. At step 410, motion blur is created within the image as a function of the motion vector provided and received at step 402. After the motion blur has been created, the image is output at step 412.

Figure 5:
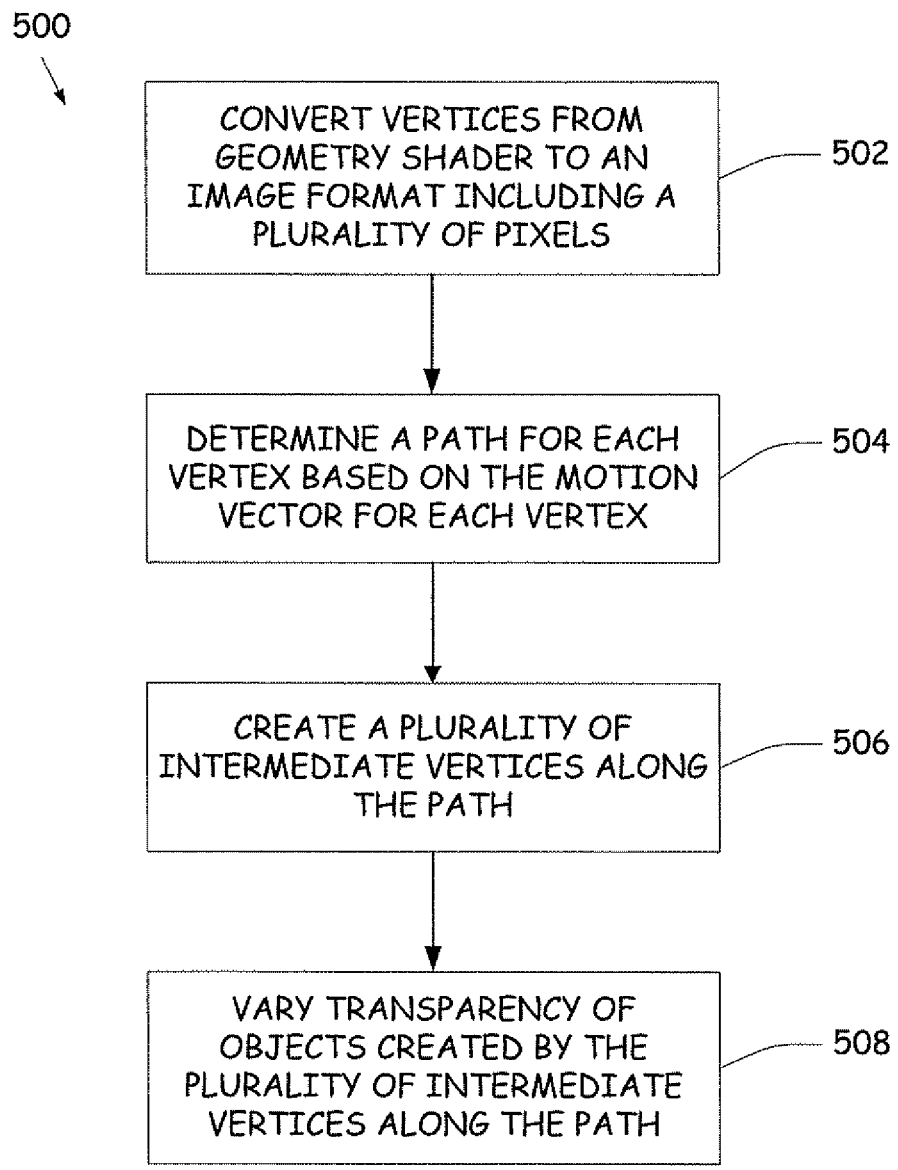
FIG. 5 is a flow diagram of a method for creating motion blur in images.
Figure 6:
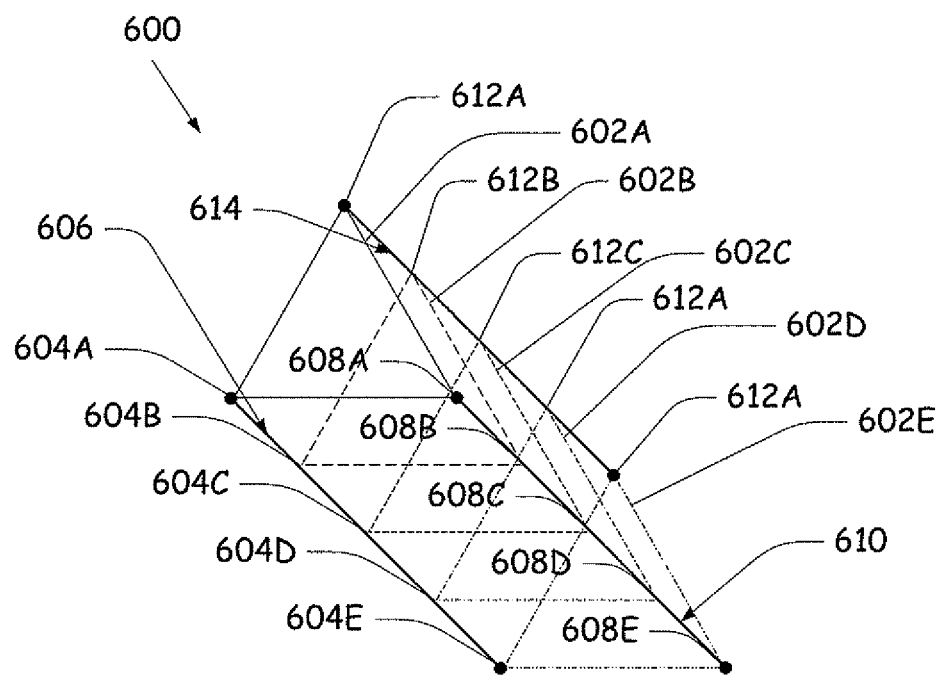
FIG. 6 is a diagram of motion blur in an image.

FIG. 5 is a flow diagram of a method 500 for adding motion blur within rasterizer 308. With reference also to FIG. 6, a schematic diagram 600 shows an illustrative example for creating motion blur. At step 502, a plurality of vertices received in rasterizer 308 are converted to an image format that includes a plurality of pixels. The plurality of pixels correspond to positions on a display device. The plurality of vertices received can be grouped as primitives and be represented in three dimensions. Conversion to two dimensions can be performed to produce the pixels. For example, triangle 602A is a triangle that has been converted to an image format in rasterizer 308 and includes vertices 604A, 608A and 612A.

At step 504, a path that the vertices traveled since the previous frame is determined based on the motion vector for each vertex. The motion vector is indicative of how far each of the plurality of vertices have moved since the previous frame was rendered and an associated direction. Vertex 604A has traveled along a path 606 since the previous frame, as determined based on the motion vector for vertex 604A. Similarly, vertex 608A has traveled along path 610 and vertex 612A has traveled along path 614.

Next, at step 506, intermediate vertices are created along the path. For example, intermediate vertices 604B-E can be created along path 606. Intermediate vertices for the other vertices in triangle 502A also are created along their respective paths. As illustrated, vertices 608B-E are created along path 610 and vertices 612B-E are created along path 614. Next, at step 508, transparency of objects created by the plurality of intermediate vertices along the path is varied. For example, each of triangles 602B-E will have more transparency than triangle 602A. Additionally, triangle 602B will be less transparent than triangle 602C, triangle 602C will be less transparent than triangle 602D, triangle, 602D will be less transparent than triangle 602E, and so on. If desired, a stretch effect can also be applied based on the motion vector. For example, an object can be "stretched" based on how large the quantity (i.e. how far each vertex has moved) is for the motion vector. If the motion vector is large, the object can be stretched more. An acceleration value can also be used to introduce a stretch effect.

Method 500 can also be employed for anti-aliasing and/or focusing techniques. Anti-aliasing refers to techniques for minimizing distortion artifacts in images. For still objects in a scene, a small random motion vector can be applied to objects. The small motion vector can be used to add blur using method 500. Due to the size of the motion vector, the blurring would be less substantial than an object in motion. Additionally, blur can be added to objects that may be out of focus for a particular image in a similar manner. For objects that are more out of focus, a larger motion vector can be applied to underlying vertices of the objects to give the appearance that the object is out of focus.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of rendering a sequence of images in frames onto a display device, comprising:
    accessing a plurality of vertices for rendering on the display device, each vertex including a motion vector indicative of a distance the vertex has traveled between a current frame and a previous frame in the sequence of images;
    adding a random motion vector to each of the motion vectors;
    utilizing the motion vectors to determine a path that each vertex has traveled between the current frame and the previous frame;
    converting the plurality of vertices to an image that includes pixels; and
    applying motion blur to the image based at least in part on locations of the pixels within the paths.

2. The method of claim 1 wherein the motion vectors are generated utilizing motion capture data, wherein the motion vector for each vertex includes a direction, and wherein applying the motion blur comprises applying a greater amount of the motion blur to the pixels that are closer to the previous frame and decreasing the amount of the motion blur as the pixels become closer to the current frame.

3. The method of claim 1 wherein a plurality of intermediate vertices are added to the image along the paths of the vertices, and wherein transparencies of the vertices are decreased along the paths in going from the previous frame to the current frame.

4. The method of claim 1 wherein at least some of the plurality of vertices are object vertices grouped together to form an object and wherein motion blur is applied to the object as a function of each motion vector of the object vertices.

5. The method of claim 4 and further comprising:
    determining a path that the object has traveled based on each motion vector of the object vertices; and
    creating a plurality of intermediate objects along the object path.

6. The method of claim 5 and further comprising:
    adjusting the transparency of the intermediate objects along the object path.

7. The method of claim 1 and further comprising:
    transforming the plurality of vertices and the motion vector for each vertex before converting the plurality of vertices to the image.

8. A computer storage medium having instructions stored thereon, which, when executed, cause a display device to render a sequence of images in frames, the instructions comprising:
    an input module adapted to receive a plurality of vertices for rendering on a display device, each vertex including a motion vector indicative of a distance the vertex has traveled since a previous frame, and each vertex having a random motion vector added to it;
    a geometry shader module adapted to utilize the plurality of vertices to generate primitives;
    a conversion module adapted to eliminate some of the primitives to form a set of remaining primitives and adapted to convert the set of remaining primitives to an image that includes a plurality of pixels; and
    a rasterizer module adapted to apply a motion blur effect to the image as a function of focus.

9. The computer storage medium of claim 8 wherein the motion vector for each vertex includes a direction, wherein the rasterizer module determines a path that each vertex has traveled since the previous frame based on the motion vector, and wherein the rasterizer applies a greater amount of the motion blur effect when the image is out of focus.

10. The computer storage medium of claim 9 wherein the rasterizer module adds a plurality of intermediate vertices to the image along the paths of each vertex, and wherein the motion blur effect includes a stretching effect.

11. The computer storage medium of claim 8 wherein at least some of the plurality of vertices are object vertices, wherein the instructions further comprise a geometry shader adapted to group together the object vertices to form an object, wherein the rasterizer module applies motion blur to the object as a function of each motion vector of the object vertices, and wherein the rasterizer also applies a focusing effect.

12. The computer storage medium of claim 11 wherein the rasterizer module determines a path that the object has traveled based on each motion vector of the object vertices and creates a plurality of intermediate objects along the path.

13. The computer storage medium of claim 12 wherein the rasterizer module further adjusts transparencies of the intermediate objects along the path such that each of the intermediate objects has a different transparency than the other intermediate objects.

14. The computer storage medium of claim 8 and further comprising:
a vertex shader adapted to transform positions of the plurality of vertices and the motion vector for each vertex before the conversion module converts the plurality of vertices to the image.

15. The computer storage medium of claim 8 wherein the input module is adapted to interface with an application that develops the plurality of vertices and provides the input module with vertex information including position, color, texture, and motion vector.

16. The computer storage medium of claim 8 wherein the instructions further comprise an output module adapted to interface with the display device to provide the image thereto.

17. A computer storage medium having instructions stored thereon which, when implemented, cause a display device to render a sequence of images in frames, the instructions comprising:
generating a plurality of vertices for a frame that corresponds to stationary and moving objects in an image in the sequence of images in response to user input;
determining a motion vector for each of the plurality of vertices that is indicative of a distance that each vertex has traveled since a previous frame in the sequence of images;
adding a random motion vector to the motion vector for each of the stationary objects;
determining intermediate vertices for each of the plurality of vertices along a path that the associated vertex has traveled since the previous frame;
utilizing the intermediate vertices to generate intermediate objects in the image; and
outputting the plurality of vertices, the motion vectors, and the intermediate objects to a graphical processing unit that adds motion blur to the stationary, the moving, and the intermediate objects in the image as a function of the motion vector for each vertex.

18. The computer storage medium of claim 17 wherein the motion vectors further include a direction that each of the plurality of vertices has traveled since the previous frame in the sequence, wherein the random motion vectors for the stationary objects include small random motion vectors such that a greater amount of the motion blur is applied to the moving objects than is applied to the stationary objects.

19. The computer storage medium of claim 17 wherein the instructions further comprise:
altering the plurality of vertices for a second frame corresponding to stationary and moving objects in a second image in the sequence of images in response to user input;
determining a second motion vector for the second frame for each of the plurality of vertices that is indicative of a distance that each vertex has traveled since the first-mentioned frame; and
outputting the plurality of vertices and the second motion vector for each vertex to the graphical processing unit that adds motion blur to the stationary and the moving objects in the second image as a function of the second motion vector for each vertex.

20. The computer storage medium of claim 18 wherein the instructions further comprise outputting a position for each of the plurality of vertices to the graphical processing unit.

* * * * *